United States Patent [19]

de Groot

[11] Patent Number: 6,042,630
[45] Date of Patent: *Mar. 28, 2000

[54] COHERENT GROWTH SUBSTRATE

[75] Inventor: Jacob Frank de Groot, Roermond, Netherlands

[73] Assignee: Rockwool/Grodan B.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/554,785

[22] Filed: Nov. 7, 1995

[30] Foreign Application Priority Data

Nov. 7, 1994 [EP] European Pat. Off. .............. 94203246

[51] Int. Cl.⁷ ................................ A01G 31/00; C01L 5/40
[52] U.S. Cl. .............................. 71/64.13; 47/48.5; 47/64; 47/74; 71/903; 71/904
[58] Field of Search .................................. 71/1, 903, 904, 71/64.13; 47/64, 74, 48.5

[56] References Cited

U.S. PATENT DOCUMENTS 5,218,783   6/1993   Langezaal et al. ..................... 47/64

FOREIGN PATENT DOCUMENTS 0156786   10/1985   European Pat. Off. .
0350132    1/1990   European Pat. Off. .
WO9300797  1/1993   WIPO .

*Primary Examiner*—Gary P. Straub
*Attorney, Agent, or Firm*—Webb Ziesenheim Logsdon Orkin & Hanson , P.C.

[57] ABSTRACT

The invention relates to a coherent growth substrate based on a synthetic matrix containing clay in a quantity of 0.1–2.5% by weight such that at a suction pressure of pf=2 the moisture content is lower than 15% by volume, preferably for use as a grow-block and for a grow-slab.

7 Claims, No Drawings

COHERENT GROWTH SUBSTRATE

BACKGROUND OF THE INVENTION

1. Field of the Invention

The present invention relates to a coherent growth substrate. The present invention relates more particularly to a coherent growth substrate which contains a specific quantity of clay and a moisture content related to the specific matrix and clay at a specific suction pressure.

2. Description of the Prior Art

From DE-A-3 121 277 is known a growth substrate for plants which consists of a non-coherent mixture of burnt and expanded clay and of mineral fibres.

EP-A-0 350 132 describes a coherent growth substrate on a basis of mineral wool and clay which contains more than 50% by weight of clay, has a density of more than 200 kg/m³ and further has a moisture content of at least 15% by volume at pF=2.

The present invention is based on the insight that with smaller quantities of clay and at a lower moisture content at pF=2 a coherent growth substrate can be provided which enables an optimum growth development and results in a considerable increase in the product yield.

The added quantity of clay is not so much intended to increase the moisture content at a suction pressure of pF=2, but is found to have a signalling function whereby a temporary decrease in the moisture content below a minimum value has no adverse effects on the plant. The clay which is present evidently provides a signal to the plant of an imminent too low moisture content.

In addition, the smaller quantity of clay nevertheless provides a sufficient cation-exchanging complex for adsorption of main and trace elements, whereby in sub-optimal conditions a supplementation of these elements to the nutrient solution in the substrate is possible.

This small quantity of clay further has an already optimal effect on the developing microflora and fauna in the growth substrate during culture.

Lastly, this smaller quantity of clay already functions as an adsorbent for "phyto" toxic substances.

The coherent growth substrate based on a synthetic matrix according to the invention is therefore characterized in that it contains clay in a quantity of 0.1–25% by weight such that at a suction pressure of pF=2 the moisture content is lower than 15% by volume.

The improvement in the plant growth and product yield is considerable and amounts, depending on the crop, the matrix and the culture conditions, to 5–20% by weight, wherein an average yield improvement of up to 15% is possible. The improved product yield is found to be realized particularly when the plant culture proceeds for a longer period under less than optimal conditions.

SUMMARY OF THE INVENTION

A coherent growth substrate containing clay in a quantity of 0.1–25% by weight wherein at a suction pressure pF=2 the moisture content of the substrate is lower than 15% by volume.

DESCRIPTION OF THE PREFERRED EMBODIMENTS

The same type of clay can generally be used as in EP-A-0 350 132, which clay can generally be designated as an inorganic soil type. The clay comprises hydrophile particles with a particle size below 20 $\mu$m which belong to the class of eroded minerals such as clays, mixtures of clays with silt and sand, wherein the clay fraction amounts to at least 20%. This inorganic soil type further comprises bentonite, kaolin and the like.

It is possible to agglomerate the clay particles to clay granules with a particle size of more than 50 $\mu$m, preferably 100 $\mu$m–10 mm, such as 1–5 mm. The use of the larger clay granules has the advantage that the clay particles cannot be fully enveloped by binding agent and wetting agent possibly necessary to form the coherent growth substrate, whereby an optimal effect of the clay is ensured. The clay further does not have to be distributed finely and homogeneously through the growth substrate. It appears to be possible for only a small number of clay granules to be present within the growth substrate to obtain the intended effect according to the invention. In a grow block (10×10×6.5 cm) for instance, 2–20 clay granules (2–5 mm) are sufficient.

The quantity of clay present in the growth substrate amounts generally to 1–20% by weight, for instance 2–10% by weight for grow-blocks and 5–20% by weight for grow-slabs (10×100×7.5 cm). It will however be apparent that other clay quantities are possible without a limit applying therein for the size of the growth substrate. What is important is that the clay can perform its signalling function and its function as cation-exchanging complex, while the development of the microflora and fauna and the adsorption of toxic substances are adequate for growth.

In another aspect the quantity of clay is such that at a suction pressure of pF=2 the moisture content is smaller than or equal to 10% by volume. The quantity of clay is generally such that in principle the moisture content is not, or hardly, changed at pF=2 of the growth substrate.

The density of the growth substrate varies subject to the type of growth substrate. For mineral wool such as rockwool, glass wool and slag wool, the density of the substrate can amount to 3–200 kg/m³, preferably 40–100 kg/m³. For other matrices such as plastics, in particular foam plastics and burnt and possibly expanded clay, the same or lower densities apply.

Because the coherent growth substrate according to the invention finds its main application in long-term culture of plants, the growth substrate is applied chiefly as grow-block and grow-slab.

In order to obtain a coherent growth substrate on a basis of the synthetic matrix and clay, it is usually recommended to use a binding agent to obtain a coherent mass. The known binding agents can generally be used such as phenol-formaldehydes, silicates and the like. For an optimum plant culture, in particular to enable rapid moistening of the growth substrate at the beginning of use, it is further recommended to add a wetting agent to the growth substrate. Known wetting agents can be used, such as surfactants.

The clay particles can be added to the growth substrate before the synthetic matrix is formed to a coherent matrix but it is likewise possible to add the clay to the already coherent matrix. When clay particles are used with a size less than 100 $\mu$m, there is the possibility of the clay particles losing their effectiveness when a binding agent and/or wetting agent are used. In that case it is possible to add the clay particles after forming of the coherent matrix or to add them in the form of a dispersion.

Mentioned and other features of the growth substrate according to the invention will be further elucidated hereinbelow with reference to a number of examples which are given purely by way of example without the intention of limiting the invention thereto.

EXAMPLE 1

A coherent growth substrate in the form of grow-blocks (10×10×6.5 cm) was prepared from a coherent matrix of mineral wool to which binding agent and wetting agent were added in usual manner. Prior to passage through the curing oven, clay in a quantity of 5% by weight (particle size 2–5 mm) was also added to the matrix which was at that moment forming and not yet coherent. The density of the coherent growth substrate amounted to 80 kg/m$^3$. At a suction pressure pF=2 the moisture content amounted to only 5% by volume.

This coherent growth substrate was used in the culture of crops such as cucumbers and tomatoes, wherein an average yield improvement was found to occur of about 15% compared to a similar coherent growth substrate without addition of 5% by weight of clay.

EXAMPLE 2

A coherent growth substrate on a basis of mineral wool was prepared, wherein clay with a particle size of 100 μm was added in the same manner as in example 1 in a quantity of 10 or 20% by weight The density of the grow-slab amounted to 55 kg/m$^3$. At a suction pressure pF=2 the moisture content was only 5% by volume. Sub-tests produced an average product yield in the same order of magnitude as obtained in the grow-blocks according to the invention used in example 1.

EXAMPLE 3

A coherent growth substrate on the basis of polyurethane foam (furniture industry waste) was prepared with the use of a conventional binding agent, while 10% by weight of clay (particle size 20 μm) was added to the matrix.

The density amounted to only 80 kg/m$^3$ and at a suction pressure pF=2 the moisture content amounted to only 2% by volume.

EXAMPLE 4

In the same manner as in examples 1 and 3 it was possible to prepare a coherent growth substrate on a basis of burnt and expanded clay granules and 10% by weight of clay (2–5 mm). A coherent matrix was prepared by making use of a conventional binding agent.

I claim:
1. A coherent growth substrate, comprising:
   a. 2–20% by weight of a natural clay containing clays or mixtures of clays with silt and sand wherein the clay fraction amounts to at least 20% clay particles;
   b. a synthetic matrix selected from the group consisting of mineral wool, plastic, burnt clay and expanded clay; and
   c. a binding agent in a quantity sufficient to bind the substrate into a coherent mass;
   wherein, at a suction pressure of pF=2, the moisture content of the substrate is less than 15%, wherein the synthetic matrix and binder form about 80% to about 98% by weight of the substrate, and wherein the density of the substrate is 30–200 kg/m$^3$.
2. The coherent plant growth substrate of claim 1, further including a wetting agent.
3. The growth substrate as claimed in claim 1, wherein at a suction pressure of pF=2 the moisture content is not greater than 10% by volume.
4. The growth substrate as claimed in claim 1, wherein the natural clay is present as agglomerated particles having a particle size larger than 50 μm.
5. The growth substrate as claimed in claim 1, wherein the quantity of clay is 2–10% by weight.
6. The growth substrate as claimed in claim 1, wherein the quantity of clay is 5–20% by weight.
7. The growth substrate as claimed in claim 1, wherein the density of the substrate is about 40–100 kg/m$^3$.

\* \* \* \* \*

UNITED STATES PATENT AND TRADEMARK OFFICE
CERTIFICATE OF CORRECTION

PATENT NO. : 6,042,630
DATED : March 28, 2000
INVENTOR(S) : Jacob Frank de Groot It is certified that error appears in the above-identified patent and that said Letters Patent is hereby corrected as shown below:

Title Page, [57] ABSTRACT Line 3 "0.1-2.5%" should read --0.1-25%--.

Title Page, [57] ABSTRACT Line 3 "pf=2" should read --pF=2--.

Column 2 Line 36 "3-200" should read --30-200--.

Column 3 Line 23 after "weight" insert period --.--.

Signed and Sealed this

First Day of May, 2001

Attest:

NICHOLAS P. GODICI

*Attesting Officer*    *Acting Director of the United States Patent and Trademark Office*